Sept. 16, 1952 H. H. DAVIS 2,610,808

MAGNETIC RECORDING APPARATUS

Filed Nov. 22, 1946 6 Sheets-Sheet 1

INVENTOR.
Hugh H. Davis
BY John F. Eakins
ATTORNEY

INVENTOR.
Hugh H. Davis
BY John J. Eakins
ATTORNEY

MAGNETIC RECORDING APPARATUS

Filed Nov. 22, 1946 6 Sheets-Sheet 3

INVENTOR.
Hugh H. Davis
BY John F. Eakins
ATTORNEY

INVENTOR.
Hugh H. Davis
BY John F. Eakins
ATTORNEY

MAGNETIC RECORDING APPARATUS

Filed Nov. 22, 1946 6 Sheets-Sheet 5

INVENTOR.
Hugh H. Davis
BY John F. Eakins
ATTORNEY

MAGNETIC RECORDING APPARATUS

Filed Nov. 22, 1946 6 Sheets-Sheet 6

INVENTOR
Hugh H. Davis
BY John F. Eakins
ATTORNEY

Patented Sept. 16, 1952 2,610,808

UNITED STATES PATENT OFFICE 2,610,808

MAGNETIC RECORDING APPARATUS

Hugh H. Davis, Chicago, Ill., assignor to J. P. Seeburg Corporation, Chicago, Ill., a corporation of Illinois Application November 22, 1946, Serial No. 711,543

20 Claims. (Cl. 242—54)

This invention relates to magnetic recording apparatus intended for making or reproducing recordings or both, on a movable magnetic medium. Such a machine may be referred to generally as a wind and rewind machine.

Generally the machine comprises means for driving a takeup reel to take up the medium during play or recording and for driving a supply reel to rewind the medium back on the supply reel. Between the two reels is located a head which oscillates to distribute the magnetic medium, preferably wire, evenly over the receiving reel. My machine comprises manually actuable stop means and automatic means for stopping the machine when nearly all the medium has been transferred to the receiving reel. I provide brakes to arrest the two reels when the machine is stopped and I prefer to provide a brake for the motor.

I provide idler wheels for connecting the motor to the reels, the arrangement being such that when one reel is thus connected the other is disconnected and vice versa.

When the machine is stopped either manually or automatically when the wire is depleted from the supplying reel both idlers are disconnected from the reels and from the motor. I interconnect the control mechanism with the brakes so that when the machine is stopped, the supplying reel is more strongly braked than the receiving reel in such manner that the wire remains taut as the moving elements coast to a stop.

In case the machine stops owing to failure of the power supply the motor remains connected to the receiving reel so that the energy of the receiving system tends to keep the wire taut.

I prefer to employ a takeup reel which is much larger than the supply reel. Owing to the large inertia of this large reel, particularly when it is well loaded with wire, there is a danger that the wire between the reels might become loose when the power fails during rewind. To obviate this danger I prefer to provide means to apply the brakes when the power fails during rewind. Owing to the differential braking effect previously referred to the large takeup reel is more strongly braked so that the wire is maintained taut no matter how the machine is stopped.

The automatic stopping of the machine is effected by means of elements associated with the reels so as to cooperate with the wire on the supplying reel. In one form, which is particularly suitable for the small supply reel, this reel is provided with a slot through which a movable element is adapted to project. This movable element is restrained by wire on the reel and when the wire is almost completely depleted from the supply reel the member is free to move outwardly and means associated with this member unlatch the control element. In the case of the larger takeup reel I prefer to employ two plungers which are arranged to project outwardly into the wire space on the takeup reel. When wire is taken up by the takeup reel the plungers are moved inwardly. These plungers are located in spaced relation in the axial direction of the takeup reel. During rewind the wire clears one of the plungers and means associated with the plunger releases the control member so that the machine is brought to a stop. Since there are several convolutions of wire between the two plungers the machine is stopped before all the wire is removed from the takeup reel near the end of the rewind operation.

The control member may suitably be a rotatable member biassed towards neutral or "off" position. When the control member is moved in one direction it closes the motor switch, connects the drive of the motor to the takeup reel and conditions the brakes so that the supply reel will be more strongly braked when the machine is stopped. When the control member is moved in the opposite direction from "off" position it closes the motor switch, connects the drive of the motor to the supply reel and conditions the brakes so that the takeup reel is more strongly braked when the machine is stopped. The control member is latched in both of the "on" positions and the machine is stopped automatically by releasing the restraining latch. The latches may also be released manually by a button provided for that purpose.

The invention will more readily be understood from the following description of a preferred embodiment thereof, taken in conjunction with accompanying drawings, in which.

Figures 1, 2, 3, 4, 5, 6:
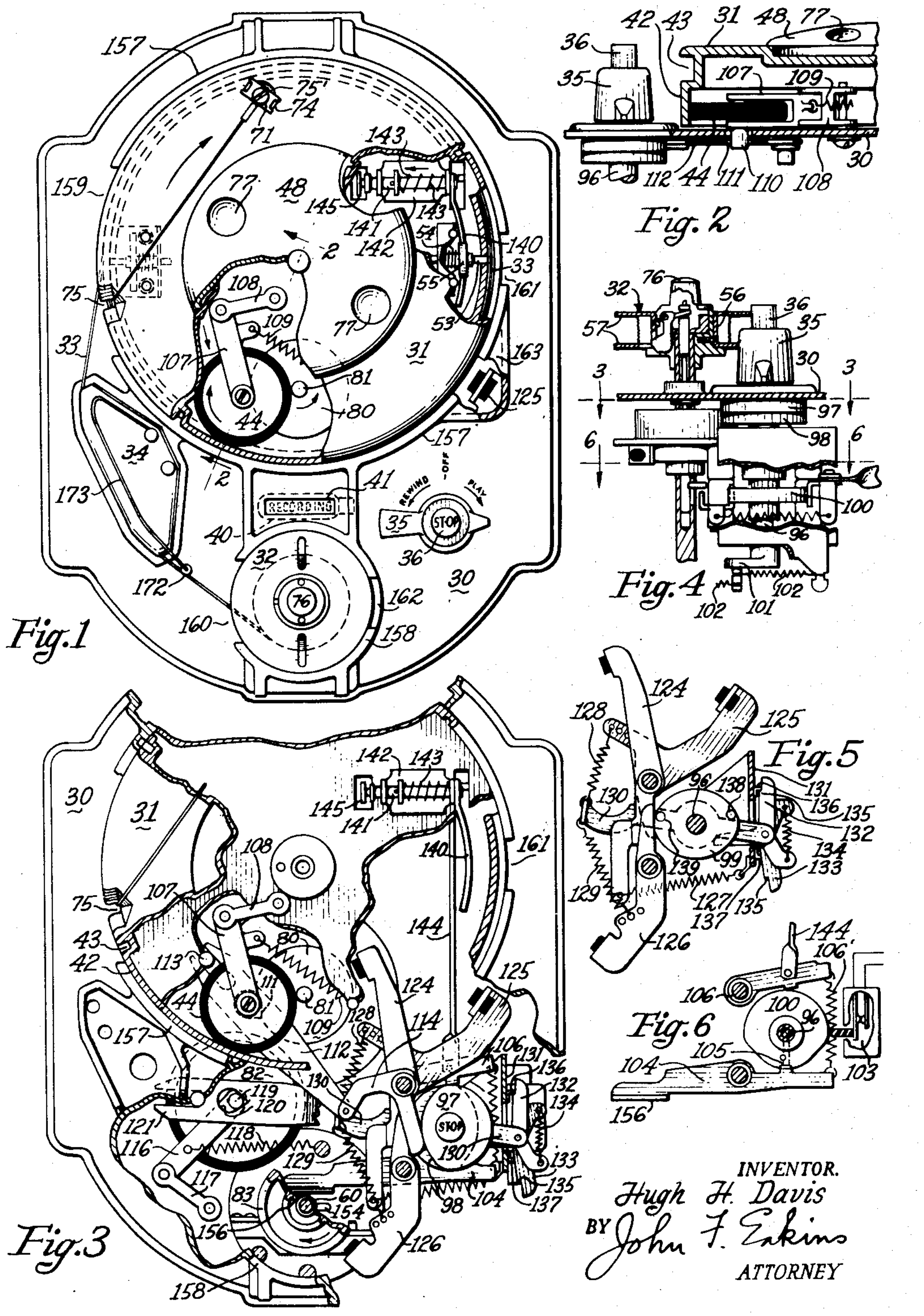
Figure 1 is a plan view of a wind and rewind machine, parts being broken away to disclose mechanisms in "wind" condition.
Fig. 2 is a fragmentary sectional elevation showing the drive of the large reel.
Fig. 3 is a fragmentary plan view similar to Fig. 1 with more portions broken away to disclose lower mechanisms, the section being generally on the line 3—3 of Fig. 4.
Fig. 4 is a fragmentary sectional elevation showing the supply reel and associated parts in sections.
Fig. 5 is a frgamentary plan view showing the brakes and associated elements.
Fig. 6 is a fragmentary sectional plan view taken in the line 6—6 of Fig. 4 showing the switch and associated elements.

Referring to the drawings the mechanism is carried by a base 30 (Fig. 1) adapted for mounting in the cabinet of a radio receiver, for example. During the reproduction or recording the takeup reel 31 is driven so as to take up the magnetic recording medium, which may be a wire 33 from the supply reel 32, the medium passing through the head 34. The head 34 is oscillated upwardly and downwardly to serve as a level wind distributing the wire evenly over the reel which is receiving it. The machine is put into operation by a manual control 35 which is turned to the "play" position for recording or play-back. When almost all of the wire has been transferred from the supply reel 32 to the takeup reel 31 the motor stops. The motor may be stopped at any time by depressing a button 36. The manual control 35 may now be turned to "rewind" position whereupon the supply reel 32 is driven in the opposite direction to transfer substantially all of the wire to the supply reel and when only a few convolutions of wire remain on the takeup reel 31 the motor again stops as will hereinafter be explained. Stoppage of the motor is accompanied by the application of brakes to various parts of the mechanism to prevent snarling or breaking of the wire due to inertia of moving elements.

The takeup reel 31 is relatively large and the wire is accommodated in the form of a coil of relatively large diameter so that the progressive building up of the wire on the takeup reel has very little effect on the wire speed. The takeup reel 31 may be used as a permanent part of the machine. The supply reel 32 is of relatively small diameter for ease of storage of a large number of such reels. This reel is readily removable so that the machine may readily play any of a large number of storage reels.

The recording head 34 includes a combined recording and play-back electromagnet 37 and an eraser electromagnet 38 which is located nearer the supply reel 32 than is the electromagnet 37. The head 34 is provided with an outwardly directed slot or recess 39 which receives the wire bringing it into engagement with both electromagnets 37 and 38 in known manner. The present invention is not concerned with the known manner in which the magnets 37 and 38 operate. It is sufficient to state that when the machine is used as a play-back unit the magnet 37 picks up a signal from the wire, which signal is converted into audible sound in known manner. When the machine is used as a recorder signal is supplied to the magnet 37 in known manner to apply recorded signal on to the wire. The eraser magnet 38 is energized in known manner when it is desired to remove signal from the wire. Preferably the eraser magnet 38 is energized during recording so that the signal may be erased from the wire and a new signal may be applied thereto at the same time. The mechanism is preferably provided with a lamp 40 which is illuminated when the eraser magnet 38 is energized. This lamp may suitably illuminate a window 41 which bears indicia such as the word "recording" in order to prevent the operator from accidentally erasing signal which he does not desire to have erased.

Figures 20, 21, 22, 23, 24:
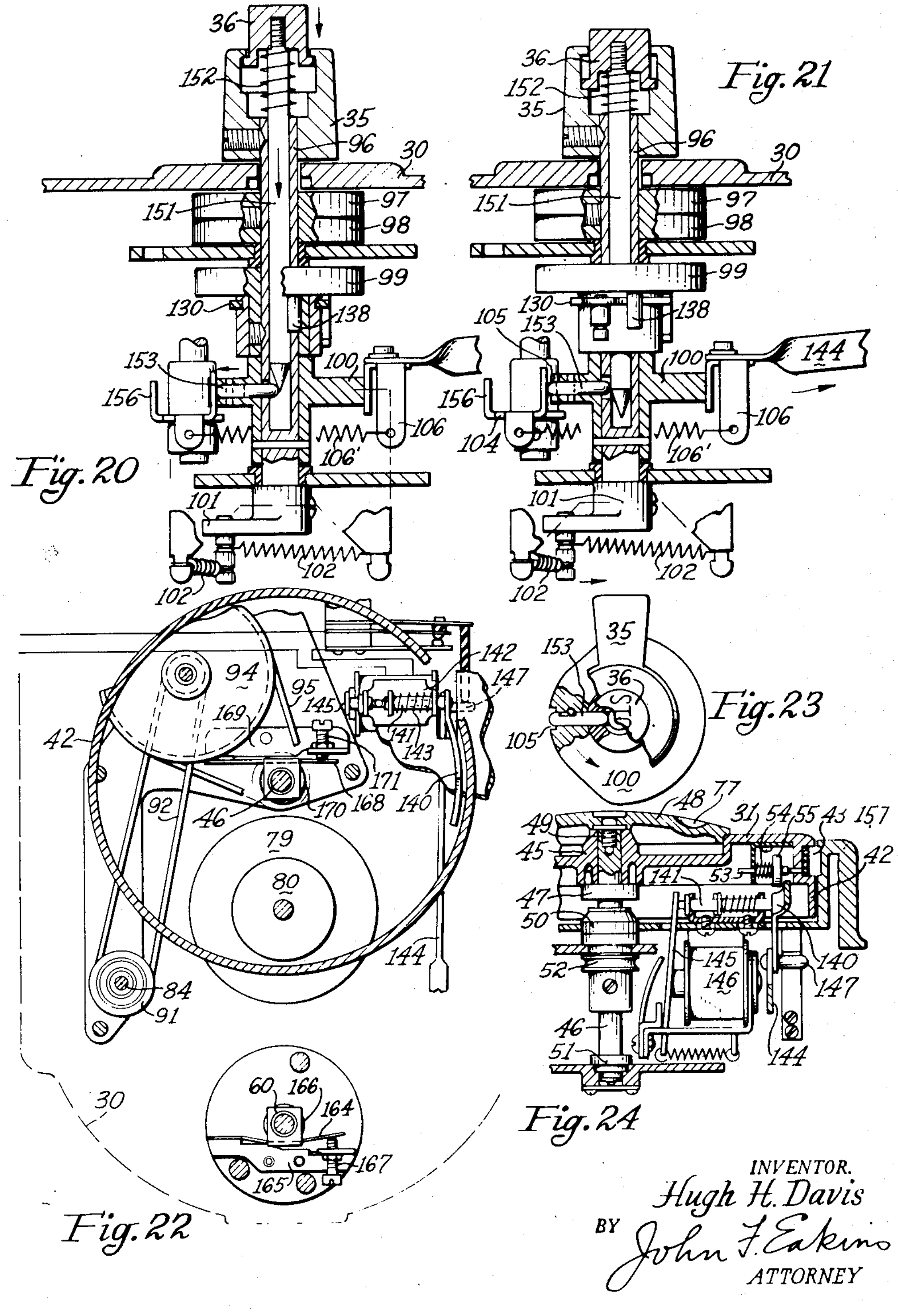
Fig. 20 is a vertical section through the control element showing the manner in which the control element is maintained in "wind" condition.
Fig. 21 is a similar view showing the manner in which the control element is released from this condition by depression of the "Stop" button 36.
Fig. 22 is a fragmentary sectional plan view showing the permanent brakes which apply braking forces to both reels.
Fig. 23 is a fragmentary plan view of the control member, parts being broken away to show concealed elements.
Fig. 24 is a fragmentary sectional elevation showing control mechanism associated with the takeup reel for effecting normal stopping of the machine when the power fails.
Figures 25, 26, 27, 28, 29, 30, 31:
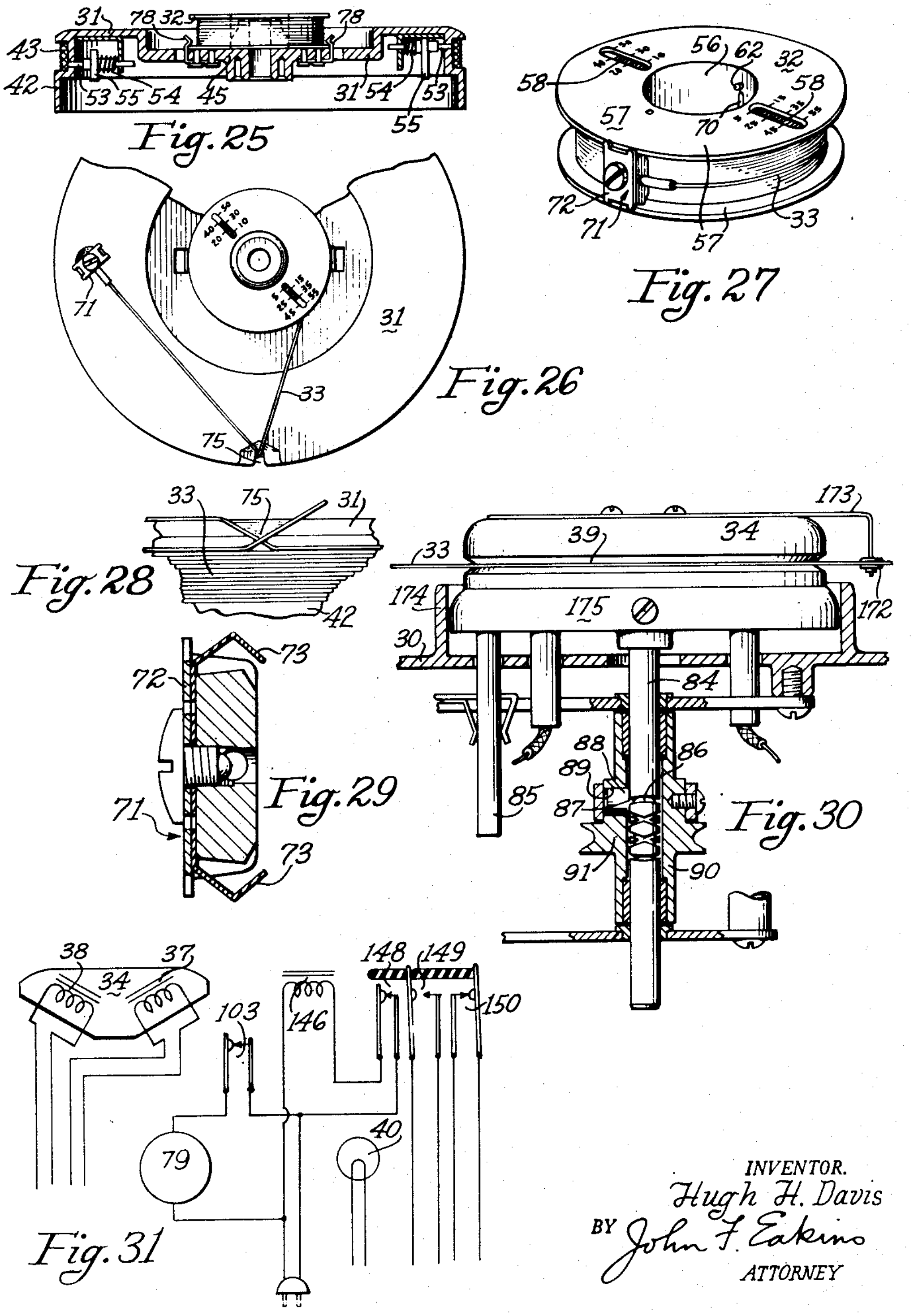
Fig. 25 is a sectional elevation of the takeup reel showing the manner in which the supply reel may be mounted thereon.
Fig. 26 is a fragmentary plan view of the reels as shown in Fig. 25.
Fig. 27 is a perspective view of the supply reel.
Fig. 28 is a fragmentary elevational view of the takeup reel showing the manner in which the medium is brought to the upper side of the reel for mounting the supply reel thereon shown in Figs. 25 and 26.
Fig. 29 is a sectional elevation of the terminal clip for the medium.
Fig. 30 is a sectional elevational view of the head and associated mechanism.
Fig. 31 is a wiring diagram.

The takeup reel 31 is generally in the form of an inverted dish as is best shown in Fig. 25. The depending skirt 42 is provided with a peripheral recess 43 in which the wire is received. The lower portion of the skirt serves as a true driving surface which is engaged by the rubber tired idler 44 shown in Figs. 1, 2 and 3. The central portion of the reel 31 is dished downwardly as shown in Fig. 25 and it is provided with a hub 45. When the reel 31 is mounted on the machine as shown in Fig. 24 the central opening of the hub 45 receives the upper end of a vertical spindle 46 and the lower surface of the hub rests on a collar 47 on this spindle. The collar carries two dowel pins which extend into corresponding openings in the hub 45. The reel 31 is firmly secured to the spindle 46 by means of a convex disc 48 which is secured to the spindle 46 by means of a screw 49 which engages a threaded hole in the upper end of the spindle. The disc 48 is provided with finger openings so that it may be unscrewed to effect removal of the reel 31. The spindle 46 is mounted for free rotation by means of bearings 50 and 51 and it carries a pulley 52.

On the under side of the reel 31 are mounted two plungers 53 which are biased radially outward by weak springs 54 into the wire receiving recess 43. The plungers 53 carry actuating members 55 which have the effect of stopping the motor and applying the brakes when only a few convolutions of wire remain on the reel 31. One of the plungers 53 is located at a high point of the recess 43 and the other is located at a low point on this recess. When the wire is being taken up by the reel 31 the head 34 distributes the first layer of wire upon the bottom of the recess 43 and the two plungers 53 are moved inwardly by the wire. During the rewind operation one of the plungers 53 is disengaged from the wire first and the machine in stopped before the convolutions of the wire between the two plungers 53 are removed from the reel 31.

The supply reel 32 (Fig. 27) may suitably comprise a cylindrical wall 56 and top and bottom flanges 57. The top wall may be provided with openings 58 and suitable indicia to indicate the length of wire on the reel. The reel 32 is removably mounted on a head 59 (Fig. 14) carried at the upper end of a rotatable hollow spindle 60. The main body of the head 59 receives the cylindrical wall 56 of the reel 32 and the lower flange of the reel is seated on a projecting flange 61 at the lower portion of the head 59. The cylindrical wall 56 carries an inwardly directed pin 62 which is adapted to be received by a slot 63 in the head 59. The head 59 is provided with a spring pressed ball 64 which is arranged to enter partly into an opening 65 in the cylindrical wall 56 when the reel is applied to the head with the projection 62 in the slot 63. The head 59 is provided with a radial slot 66 within which is pivotally mounted a bell crank lever 67. One arm of the lever 67 is forked to engage a projection 68 on the upper end of a plunger 69 located within the hollow spindle 60. The lower flange of the reel 32 and its cylindrical wall 56 are provided with a slot 70 which is in alignment with the other arm of the lever 67 when the reel 32 is applied to the head 59 with the projection 62 in the slot 63. It will be readily understood from Fig. 14 that when a loaded reel 32 is thus applied to the head 59 the wire on the reel will swing the bell crank lever 67 in counterclockwise direction as viewed in Fig. 14 and that the lever will consequently elevate the plunger 69. When however almost all the wire has been withdrawn from the reel 32 the weight of the plunger 69 will cause the plunger to drop, since the bell crank lever is now free to enter the slot 70. This descent of the plunger stops the motor and applies the brakes in manner hereinafter to be described. The wire is permanently secured to the reel 32 at or near its upper flange so that the stoppage of the machine will occur before all the convolutions of the wire are withdrawn from the reel 32, since the slot 70 is located in the lower part of the reel.

In order to facilitate handling of the wire I secure to the free end thereof a clip 71 which comprises an outer plate 72 and inner resilient contacts 73. The contacts 73 are spaced so that they can enter between the flanges of the reel 32 and resiliently engage them, the outer plate 72 extending over the peripheries of the flanges as shown in Fig. 27. On the upper surface of the takeup reel 31 I provide an opening 74 which is adapted to receive the clip 71 in the same manner as do the flanges of the reel 32. I provide a slot or recess 75 in the upper flange of the wire receiving recess 43 of the takeup reel 31. Consequently to prepare the machine for operation the reel 32 is applied to the head 59, this head being provided with an upwardly projecting handle 76 so that the head can be held stationary in desired position during the application of the reel 32. The clip 71 is then grasped to unreel the free end of the wire which is passed around the head 34 into the recess 75. The clip 71 is then pushed into the opening 74 and the reel 31 may be rotated by hand so as to take up the slack in the wire. The machine may now be started by actuation of the manual control 35 into the play or record position. After reproduction and rewinding the machine stops with a few convolutions of wire on the reel 31. The supply reel 32 may be rotated by the handle 76 so as to take up these few convolutions whereupon the clip 71 is removed from the recess 74 and all the wire is taken up by manual manipulation of the supply reel 32. The clip 71 is then applied to the takeup reel 32 in the manner shown in Fig. 27 and this reel may now be removed for storage and replacement. The recess 74 is provided with a nail hole extension 75' to facilitate removal of the clip 71 from the reel 31.

The machine illustrated with a supply reel 32 of about two and one-half inches in diameter accommodates seventy-two hundred feet of wire, sufficient, with an average wire speed of two feet per second, for playing for one hour. Of course with larger reels the play time may be increased to any desired extent. The rewind time is approximately one-fifth the play time. In some exceptional cases it may be desired to operate this machine substantially without intervals for rewinding. In this event the reels 31 and 32 may be removed and may be replaced with other reels for resumed playing with only a few seconds delay. The reel 32 may be removed by simply lifting it upwardly. The reel 31 may be removed by unscrewing the disc 48 with the aid of the finger holes 77 whereupon the reel 31 may be lifted up and replaced. The removed reel 31 may be rewound on a rewind machine or the two removed reels 31 and 32 may be stored for rewinding at a later time. To facilitate such storage I provide in the central dished portion of the reel 31 two clips 78 which engage the lower flange of the reel 32 which is applied to the upper portion of the hub 45, as shown in Fig. 25. The end of the wire which is permanently attached to the reel 32 is passed through the notch 75 in the manner shown in Figs. 26 and 28, this notch being of crisscross formation as shown in Fig. 28 so as to avoid kinking the wire.

Figures 7, 8, 9, 10, 11, 12:
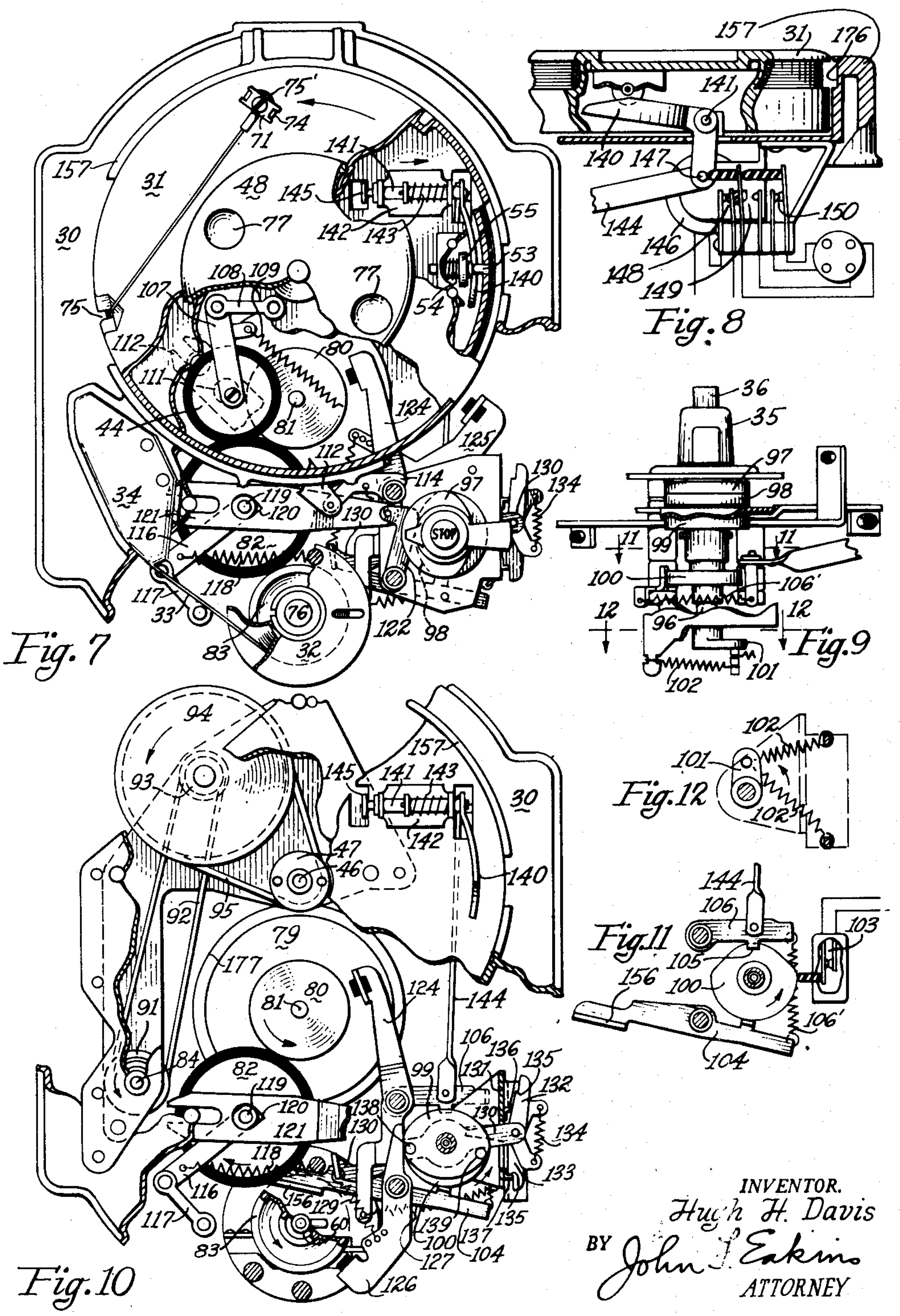
Fig. 7 is a plan view similar to Fig. 3 showing the elements in "rewind" condition.
Fig. 8 is a fragmentary elevational section showing part of the large reel and associated mechanism which is actuated at the end of the rewind operation.
Fig. 9 is an elevational view of the control mechanism in rewind position.
Fig. 10 is a fragmentary plan view similar to Fig. 7, the takeup reel and most of the base plate being omitted to illustrate mechanisms therebeneath, which elements are shown in "rewind" condition.
Fig. 11 is a sectional plan detail view similar to Fig. 6 and taken on the line 11—11 of Fig. 9 showing the switch and associated elements in "rewind" condition.
Fig. 12 is a sectional plan detail view showing part of the control element in "rewind" condition, the section being taken in the line 12—12 of Fig. 9.

The machine is driven by a motor 79 (Fig. 10) mounted in the lower part of the machine with its axis vertical. Its spindle carries a wheel 80 located below the base 30 and a small drive wheel 81 which projects through the base so as to be engaged by the rubber tired wheel 44 which also engages the skirt 42 of the reel 31 when that reel is being driven. When the reel 31 is not being driven the rubber tired wheel 44 is maintained out of engagement with both the wheel 81 and the skirt of the reel 31 as shown in Fig. 7. A retractable rubber tired wheel 82 is arranged to engage the wheel 80 and a wheel 83 which is rigidly mounted on the shaft 60, during rewind as shown in Fig. 7. During play or recording the rubber tired wheel 82 is out of engagement with the wheels 80 and 83 as shown in Fig. 3.

The head 34 is rigidly mounted on a shaft 84 (Fig. 30) and has depending therefrom a rod 85 which extends downwardly through an opening in the base 30 to prevent the head from turning. The shaft 84 is provided with an endless double thread 86 which is engaged by a detent 87 on a cylindrical block 88. The block 88 is rotatably mounted in a cylindrical opening 89 on a sleeve 90 which is rotatably mounted on the shaft 84. The sleeve 90 is held against longitudinal movement and it includes a pulley wheel 91 whereby it may be driven. When the sleeve 90 is driven the detent 87 following the endless thread 86 moves the shaft 84 and head 34 up and down continuously, its displacement being equal to the depth of the wire receiving spaces in the reels 31 and 32. The arrangement is such that the slot or groove 39 moves between the upper and lower levels of the wire receiving spaces of both reels. The pulley 91 is driven by a belt 92 from a pulley 93 which is integral with a larger pulley 94 (Fig. 10). The pulley 94 is driven by a belt 95 from the pulley 52 on the shaft 46 which supports the reel 31. It is to be noted that this reel is driven during play and recording but during rewind it is also driven by the wire which is being taken up by the supply reel 32. Consequently during both wind and rewind the head 34 is oscillated upwardly and downwardly to serve as a level wind for the reel receiving the wire. The pitch of the screw 86 is arranged to place the wire convolutions quite closely on the smaller reel 32 and consequently the convolutions applied to the reel 31 are spaced further apart. If desired the drive of the pinion 91 may be varied between the wind and rewind positions so that the same close winding may be attained on both the reels 31 and 32.

The manual control 35 is a lever having an indicating point which cooperates with indicia on the base 30 to indicate the "wind," "off" and "rewind" positions. The control 35 is moved from one position to the next through 90°. The control 35 is rigidly mounted on a hollow shaft 96 (Figs. 20 and 21) which rigidly carries four cams 97, 98, 99 and 100 and at its lower end the shaft 96 rigidly carries a crank 101. Two springs 102 are connected to the crank 101 so as to bias it towards the intermediate or "off" position. When the manual control 35 is moved to wind or rewind position the springs 102 are tensioned. The rewind position of the crank 101 is shown in Fig. 12. In the wind position the crank occupies an opposite radial position.

The cam 100 controls the switch 103 which energizes the motor. In the off position the switch is open. In the wind position (Fig. 6) and in the rewind position (Fig. 11) the switch is closed. When the control 35 is moved to wind position a detent on a lever 104 enters a recess 105 in the cam 100 and holds the control 35 and shaft 96 in this position as shown in Fig. 6 until the lever 104 is actuated whereupon the control 35 and the cams on the shaft 96 return to the off position, the cam 100 permitting the switch 103 to open. Likewise when the control 35 is moved to rewind position, a detent on a lever 106 enters the recess 105 and maintains the shaft 96 and associated elements in the rewind position until the lever 106 is actuated. The levers 104 and 106 are biased towards the cam 100 by a common spring 106'.

The cam 97 controls the rubber tired wheel 44. This wheel is rotatably mounted in a yoke 107 which is pivotally connected to a link 108. This link is pivotally mounted on the upper side of the base 30. A spring 109 connected to the yoke 107 biasses the wheel 44 into engagement with the drive wheel 81 and the skirt 42 of the reel 31. A projection 110 (Fig. 2) extends downwardly from the yoke 107 through a relatively large opening in the base 30 and is received in a relatively large opening 111 in a link 112 slidably mounted on the under side of the base 30. The free end of the link 112 is forked as shown in Fig. 3 and is guided and supported by a stud 113 depending from the base 30 (Fig. 3). The other end of the link 112 is pivotally connected to one arm of a bell crank lever 114 which engages the cam 97. When the control 35 is in the wind position the bell crank lever 114 engages a low part of the cam 97 under the action of a spring 115 and the spring 109 brings the wheel 44 into engagement with the drive wheel 81 and the skirt of the reel 31. The opening 111 is sufficiently large that the link 112 is out of engagement with the projection 110 during winding operation. When the control 35 is moved to the off and rewind positions the bell crank lever 114 is engaged by high parts of the cam 97 so that the wheel 44 is moved out of contact with the drive wheel 81 and the skirt 42 of the reel 31.

Figures 13, 14, 15, 16, 17, 18, 19:
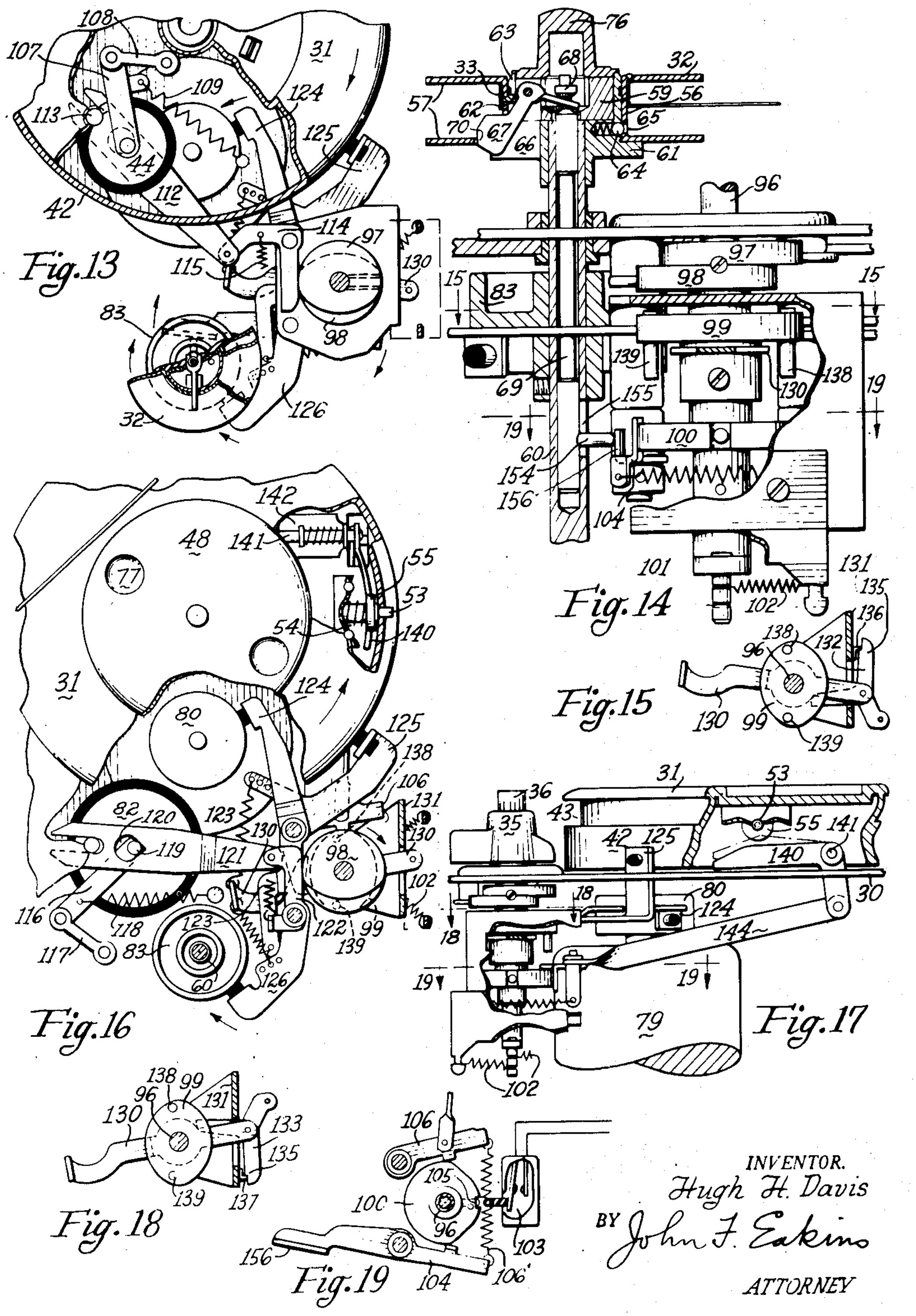
Fig. 13 is a fragmentary sectional plan showing the manner in which the brakes are applied and the drive of the takeup reel is disconnected at the end of a "wind" operation.
Fig. 14 is a fragmentary elevational view showing the supply reel and associated parts in section, the elements being shown in condition to stop the machine at the end of the "wind" operation.
Fig. 15 is a sectional plan detail view taken on the line 15—15 of Fig. 14 showing the manner in which the lever 130 is conditioned more effectively to brake the supply reel at the end of the "wind" operation.
Fig. 16 is a fragmentary plan view similar to Fig. 13 showing the manner in which the brakes are applied and the drive of the supply reel is disconnected at the end of the "rewind" operation.
Fig. 17 is a fragmentary sectional elevational view showing the manner in which the machine is stopped at the end of the "rewind" operation.
Fig. 18 is a fragmentary sectional plan view taken on the line 18—18 of Fig. 17 similar to Fig. 15 showing the manner in which the lever 130 is conditioned more strongly to brake the takeup reel at the end of the rewind operation.
Fig. 19 is a sectional detail plan view taken on the line 19—19 of Fig. 14 or Fig. 17 showing the manner in which the switch is opened at the end of either the "wind" or "rewind" operation.

The cam 98 controls in similar manner the rubber tired wheel 82 which engages the drive wheel 80 and the wheel 83 during rewind. The wheel 82 is rotatably mounted in a yoke 116 which is pivotally connected to a pivotally mounted arm 117. A spring 118 biasses the wheel 82 into engagement with the wheels 80 and 83. A projection 119 on the yoke 116 projects upwardly through a large opening 120 in a link 121 which is slidably supported at its free end in the same manner as the link 112. The other end of the link 121 is pivotally connected to a lever 122 which is biassed by a spring 123 into engagement with the cam 98. When the control 35 is in rewind position the lever 122 engages a low part of the cam 98 so that the spring 118 forces the wheel 82 into engagement with the wheels 81 and 83. The opening 120 is sufficiently large so that the link 121 is out of engagement with the projection 119 in this position which is shown in Fig. 7. When the control 35 is moved to the off position or to the wind position the lever 122 engages a high part of the cam 98 and the link 121 forces the wheel 82 out of engagement with the wheels 80 and 83. The off position of these elements is shown in Fig. 16.

The cam 99 controls the brakes 124, 125 and 126 which are levers carrying suitable braking material arranged to engage the wheel 80, the outer surface of the skirt 42 of the reel 31 and the wheel 83 respectively. The ends of the brake levers remote from the braking elements are biased against the periphery of the cam 99 by suitable springs as shown in Fig. 5 so that these springs tend to apply the brakes. The cam 99 is substantially oval in shape. When the cam 99 is in wind position the brake levers engage a high part of the cam 99 as shown in Fig. 5 so that the brakes are held out of operation. The same is true when the cam 99 is in rewind position as shown in Fig. 10. When the cam 99 is in the off position as shown in Fig. 16 the brakes are applied since a low part of the cam 99 is opposite the brake levers. The brake 124 is applied by the spring 127. The brakes 125 and 126 are applied by springs 128 and 129 respectively. At the end of rewinding it is preferred to increase the braking effect on the large reel 31 so as to maintain the wire taut. Likewise at the end of the winding operation it is preferred to increase the braking effect on the reel 32 so as to keep the wire taut. In both cases it is desirable to brake more effectively the delivering reel. For this purpose the springs 128 and 129 are connected to one end of a movable lever 130 which is pivotally mounted on the shaft 96 below the cam 99. The other end of the lever 130 projects through an opening in the vertical wall of a stationary bracket 131 as best seen in Figs. 5 and 10. At its extremity the lever 130 pivotally carries two three armed levers 132 and 133. One arm of each lever projects outwardly and these two arms are connected by a spring 134. Another arm of each lever is provided with a shoulder 135. The wall 131 carries two projections 136 and 137 which are adapted to be engaged by the shoulders 135. The third arm of each lever 132 and 133 extends inwardly through the opening in the wall 131 in the general direction of the lever 130. The spring 134 biasses the arms carrying the shoulders 135 towards the wall 131 and biasses the inwardly directed arms into position beyond the sides of the adjacent portion of the lever 130. Depending from the cam 99 are two pins 138 and 139 which cooperate with the inwardly directed arms of the levers 133 and 132 and with the righthand portion of the lever 130 as viewed in Figs. 5 and 10. These pins miss the lefthand side of the lever 130 since that portion of the lever is displaced downwardly out of their path. When the control 35 is moved to rewind position (Fig. 10) the pin 139 engages the inwardly directed arm of the lever 132 raising it out of engagement with the associated projection 136. The final movement of the control member 35 into rewind position carries the lever 130 upwardly and permits the shoulder 135 of the lever 133 to engage the lower projection 137 as viewed in Fig. 10. This displacement of the lever 130 increases the tension on the spring 128 so that an increased braking effect is applied to the drum 31 at the end of the rewind operation. The lever 130 maintains that position until the manual control 35 is subsequently moved to the wind position. As the control 35 approaches the wind position the pin 138 engages the inwardly extending arm of the lever 133 so that this lever is swung to disengage its shoulder from the lower projection 137 as viewed in Figs. 5 and 10. The final movement of the control 35 into wind position carries the lever 130 in the clockwise direction as viewed in these figures until the shoulder 135 of the lever 132 engages the upper projection 136 as viewed in Fig. 5. Consequently in the wind position the lever 130 has been displaced so as to increase the tension on the spring 129 thus increasing the braking effect on the reel 32 when the brakes are applied at the end of the wind operation. This condition of the lever 130 continues until the control 35 is again moved to the rewind position. The lever 130 remains in its position in Fig. 15 at the end of the wind operation and it remains in its position of Fig. 18 after the end of the rewind operation.

The actuating members 55 carried by the reel 31 cooperate with a lever 140 which is pivotally mounted by means of a shaft 141 on a bracket 142 carried by the base 30 below the reel 31. A spring 143 mounted on the shaft 141 to engage the bracket 142 and a collar on the shaft 141 biasses the lever 140 into its position in Fig. 1 in which it registers with the actuating members 55 when the plungers 53 are held in by wire on the reel 31. The level 140 has a downwardly extending arm (Fig. 17) which is connected by a link 144 to lever 106 (Fig. 11). The inner end of the shaft 141 is engaged by the armature 145 of an electromagnet 146. When this electromagnet is energized its armature displaces the shaft 141 so as to bring the lever 140 into register with the path of the actuating members 55 when the plungers 53 are freed to move radially outwardly on the drum 31 as a result of the removal of wire from that drum. The pivot 147 which connects the lever 140 to the link 144 is extended as shown in Fig. 24 so as to cooperate with the switches 148, 149 and 150. During the wind operation the detent of the lever 106 engages a high part of the cam 100 (Fig. 6) so that the lever 140 is held down out of the path of the actuating members 55 as shown in Fig. 17. The switch 148 is held open so that the electromagnet 146 is deenergized, the switch 149 is held closed and the switch 150 is open. The switches 149 and 150 may suitably serve as muting switches to prevent reproduction of sound during rewinding. The switch 149 may suitably be in the B supply of the amplifier and the switch 150 may be shunted across the voice coil of the speaker.

During rewind the detent of the lever 106 enters the recess 105 in a low part of the cam 100 (Fig. 11) and the link 144 is moved to the left as viewed in Fig. 8 so that the lever 140 is elevated to a position high enough to cooperate with the actuating members 55. The switch 148 is now closed energizing the electromagnet 146 so that the lever 140 is displaced outwardly into the position shown in Fig. 7 so that it can be engaged by the first actuating member 55 whose plunger 53 is released by the removal of wire from the reel 31. When one of these plungers is thus released its actuating member depresses the lever 140 so that the detent of the lever 106 is withdrawn from the recess 105 in the cam 100 whereupon the control 35 moves to the off position and the machine is stopped in the manner previously described. In the event that the power supply is interrupted during the wind operation, the higher inertia of the reel 31 keeps the wire taut as the machine coasts to a stop. If the power supply is interrupted during the rewind operation the higher inertia of the reel 31 would cause this reel to feed out a certain length of wire which would not be taken up by the supply reel 32. This machine takes care of that possibility since interruption of the power supply to the motor deenergizes the electromagnet 146 and allows the lever 140 to move inwardly into the path of the actuating members 55 which are held inwardly by the wire on the reel 31. Consequently the lever 140 is actuated to withdraw the detent of the lever 106 from the recess 105 in the cam 100 so that the shaft 96 moves to the off position applying the brakes to the machine. Since this occurs during rewind operation the lever 130 applies stronger braking pressure to the reel 31 so that the wire is maintained taut between the two reels 31 and 32. In order to reduce the inertia of the large reel 31 it is preferred to make this reel of aluminum, plastic or other light material but ordinarily its inertia is much greater than that of the reel 32.

The stop button 36 is mounted on the control 35 as shown in Figs. 20 and 21. This button is rigidly mounted on a rod 151 which is slidably mounted in the hollow shaft 96. The rod 151 and the button 36 are biassed upwardly by a coil spring 152. A plunger 153 is mounted for limited movement in a radial bore in the cam 100 which opens into the recess 105 in this cam. When the detent of either lever 104 or 106 is located in the recess 105, that is during wind or rewind the inner end of the plunger is projected into the bore of the shaft 96 as shown in Fig. 20. The lower end of the rod 151 is pointed so that downward actuation of the button 36 cams the plunger 153 radially outwardly so that the detent of the lever 104 or 106 as the case may be is moved out of recess 105 so that the hollow shaft 96 and the control 35 are free to move to the off position. In Fig. 21 the plunger 153 has just displaced the detent of the lever 104 from the recess 105 and the shaft 96 is now free to move to off position. Actuation of the button 36 promptly stops the machine and applies the brakes in such manner that the wire is maintained taut.

The plunger 69 is provided with a radially directed pin 154 which projects outwardly through a slot 155 in the hollow spindle 60 which carries the supply reel 32 (Fig. 14). The pin 154 is arranged to cooperate with the upturned flange 156 on the lever 104. When the plunger 69 is in its elevated position owing to engagement of wire on the reel 32 with the lever 67 the pin 154 rotating with the spindle 60 misses the flange 156. When however the wire is almost depleted from the reel 32 the plunger 69 is free to move downwardly so that the pin 154 engages the flange 156 and withdraws the detent of the lever 104 from the recess 105 of the cam 100. The shaft 96 and the control 35 now move to the off position stopping the motor and applying the brakes. It is to be noted that when the control 35 is in the off position the cams 97 and 98 maintain the rubber tired wheels 44 and 82 out of engagement with the wheels with which they cooperate. Consequently when the machine is out of operation for prolonged periods of time there is no risk of the rubber tires of these wheels being deformed.

It is preferred to provide on the base 30 walls or formations 157 and 158 which substantially surround the reels 31 and 32 when they are mounted on the machine. These walls are provided with openings 159 and 160 to permit the wire to pass from reel to reel. They are also provided with opposed openings 161 and 162 respectively which enables the operator to engage the reels at opposite sides during removal or application. The base 30 is also provided with a housing 163 to accommodate the brake 125 which cooperates with the reel 31.

In addition to the brakes 125 and 126 I prefer to provide additional brakes for the reels 31 and 32 which apply constant resistance to movement of the reels. Consequently during wind and rewind the delivering reel is always opposed to some extent so that the wire is maintained taut. The brake for the spindle 60 which carries the reel 32 may suitably be in the form of a spring 164 (Fig. 22) which is carried by a bracket 165 and is resiliently forced against a small brake drum 166 carried by the spindle 60. The pressure of the spring 164 on the spindle 60 may be adjusted by means of a screw 167 carried by the bracket 165. A similar spring 168 carried by a bracket 169 is pressed against a small brake drum 170 carried by the shaft 46. The pressure exerted by the spring 168 on the shaft 46 can be adjusted by means of a screw 171.

I also prefer to provide a snubber 172 (Fig. 30) which exerts a certain pressure on the wire between the supply reel 32 and the head 34. This snubber may be in the form of a suitable contact which engages the wire and is carried by a spring 173 mounted on the upper side of the head 34. The tension of the spring 173 is sufficient to bend the wire slightly. In case of minor frictional resistance on the wire coming off the reel 32 the snubber 172 yields so that the wire moves through the head 34 at substantially uniform speed.

I provide on the base 30 around the head 34 an upstanding flange 174. The head 34 comprises a lower portion 175 which is slightly spaced from the flange or housing 174 and is sufficiently deep so that it does not elevate substantially above the upper edge of the flange 174 during the oscillation of the head. The flange 174 serves as a guard preventing the user from locating his fingers below the head where they might be injured by the downward movement of the head.

In the wall 157 which is located around the reel 31 I provide a recess 176 (Fig. 8) which registers with the wire receiving peripheral recess 43. In case one or more turns of the wire on the drum 31 become loose they expand into the recess 176 and are prevented from working into the space between the skirt of the drum 31 and the wall 157. Consider the lowermost convolution of wire on the drum 31 which may be freed of tension. The circle of wire tends to increase in diameter and one portion of it is projected over the space between the skirt of the drum 31 and the lower portion of the wall 157. Continued expansion of this convolution of wire projects a portion of the circle across the gap and into the recess 176 so that now two portions of the wire bridge the gap and the convolution may grow until it is supported on the lower edge of the recess 176 which registers with the ledge at the lower side of the recess 43. When the wire is again made taut it is transferred back into the recess 43 without any risk of wire dropping into the gap.

I prefer to provide the motor 79 with a substantial fly wheel 177 (Fig. 10) to promote stability of wire speed. Preferably the inertia of the fly wheel is sufficiently great so that the inertia of the rotating elements associated with the receiving reel is always greater than the inertia of the supplying reel. In this case the shaft 141 may be non-slidably mounted shown in Fig. 36 and the relay 46 and switch 148 may be omitted so that the motor is stopped during rewind by actuation of the lever 148 only when one of the plungers 53 is moved radially outwardly as a result of depletion of the wire from the drum 31. In this case if the power supply fails during rewind the inertia of the fly wheel 177, motor 79, the reel 32 and associated parts is greater than the inertia of the reel 31 so that the wire remains taut as the mechanism coasts to a stop. Resumption of the power supply puts the machine into operation again. Likewise if the power is interrupted during play or recording the inertia of the drum 31, the motor 79 and the fly wheel 177 is greater than the inertia of the reel 32 and associated parts so that the wire is maintained taut as the machine coasts to a stop.

Figures 32, 33, 34, 35:
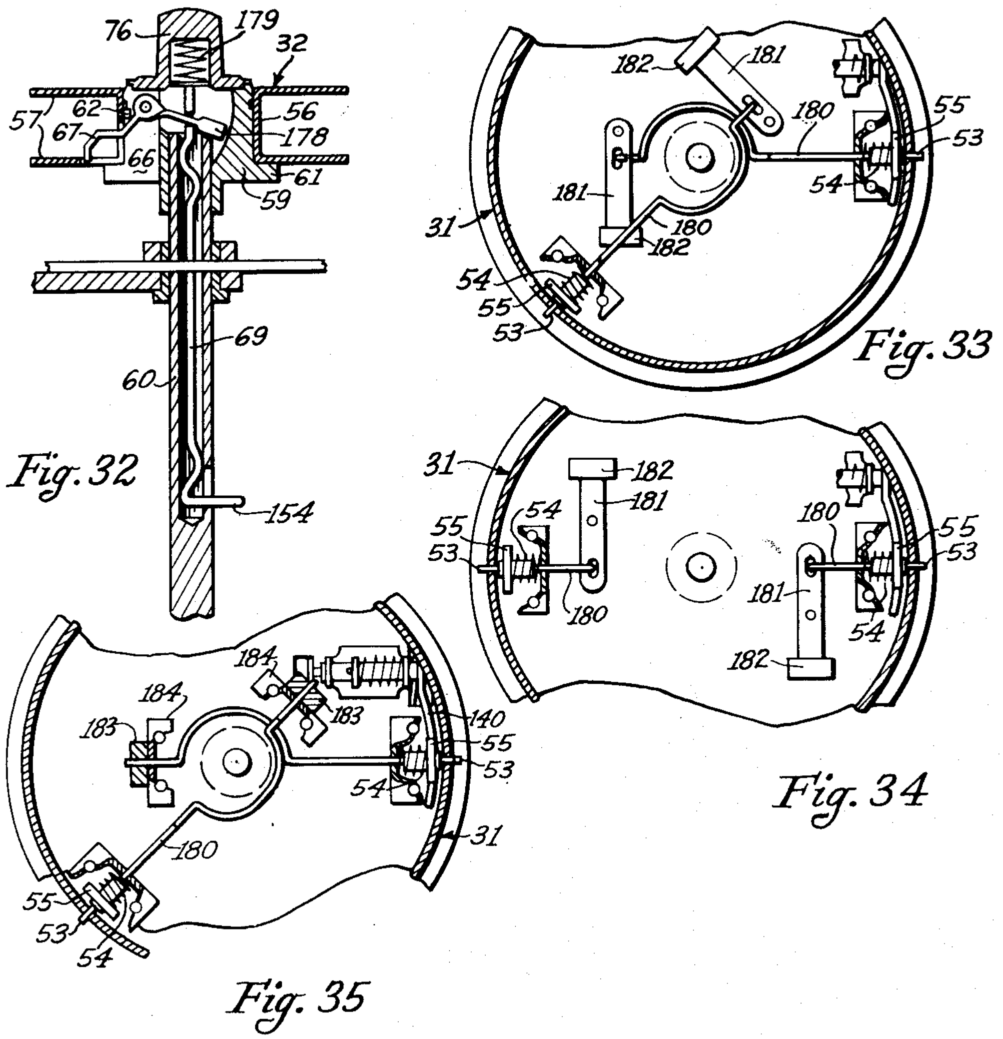
Fig. 32 is a sectional elevation of the supply reel and a modified form of the mounting thereof in which the stopping mechanism is balanced centrifugally.
Fig. 33 is a sectional plan view of the takeup reel showing modified means for stopping the machine at the end of the "rewind" operation, which are balanced centrifugally.
Fig. 34 is a view similar to Fig. 33 showing a modified form of centrifugally balanced means for stopping the machine.
Fig. 35 is still another similar view showing a still further modified centrifugally balanced means for stopping the machine.

In the previously described embodiments the elements 67 and 53 which engage the wire are unbalanced centrifugally. These elements are normally made as light as possible but in some cases the centrifugal unbalance may be objectionable. In some cases they may distort the wire out of round so that variations are introduced into the wire speed. In Figs. 32 to 35 I have shown modifications in which these elements are balanced centrifugally and are biassed outwardly by a constant slight pressure so that they are unable to distort the wire. In Fig. 32 I have shown the preferred structure for the supply reel. In this embodiment the lever 67 is made quite light and its inwardly directed arm is extended past the axis of rotation and is provided with a weight 178 which renders the bell crank lever independent of centrifugal force. The only force tending to move the outer end of the bell crank lever into the wire space is that provided by the plunger 69, which may suitably be a stout wire bent at its lower end to provide the projecting pin 154. Ordinarily the weight of the plunger 69 is sufficient to provide the slight outward bias to the bell crank lever 67 but in case it is desired to increase this bias a spring 179 may be located within the handle 76.

In Fig. 33 I have shown a modification in which the plungers 53 are balanced centrifugally and are biassed outwardly by the constant slight force provided by the springs 54. The plungers 53 are provided with extensions 180 which extend past the axis and are pivotally connected to intermediate positions of levers 181, which are pivotally mounted on the under side of the reel 31. The levers 181 are provided at their free ends with weights 182. These weights are of such magnitude and location that the plungers 53 are balanced centrifugally so that the plungers 53 are biassed outwardly only by the force provided by the springs 54 at all times.

In the embodiment of Fig. 34 the levers 181 are pivotally mounted at intermediate points on the under side of the reel 31 on the same side of the axis as the plungers 53 to which they are connected. Each extension 180 is connected to one end of the lever 181 and the weight 182 is mounted on the other side of the pivot of the lever 181. Here again the weights 182 are of such magnitude and location that the plungers 53 are balanced centrifugally and they are biassed outwardly at all times only by the constant force provided by the springs 54.

In the embodiment shown in Fig. 35 pivoted levers are dispensed with. The extensions 180 extend beyond the axis and carry at the inner ends weights 183. The extensions may suitably be guided in brackets 184 depending from the under side of the reel 31. The magnitude and the location of the weights 183 are arranged so that each plunger 53 is balanced centrifugally and these plungers are biassed outwardly at all times only by the pressure provided by the springs 54.

It is important that the elements 67 and 53 be biassed outwardly at all times. Thus if the machine is stopped automatically by the outward projection of a plunger 53 at the end of the rewind operation, the operator may accidentally move the control lever back to rewind position. If centrifugal force were relied upon to project the plungers 53, the wire would probably be broken before the freed plunger 53 was moved outwardly again to stop the machine.

As the wire builds up on a receiving reel the tension of the wire increases and the load on the motor increases. The increase of the load tends to reduce the speed of the motor with the result that the wire speed tends to vary substantially. By using a small supply reel in which the wire initially occupies a large part of the radius and a large takeup reel in which the wire builds up on a relatively small part of the radius I am able to reduce the increase of tension on the wire to an extent so that I can select a motor which gives me substantially uniform wire speed throughout the winding operation. In other words as the wire builds up on the takeup reel the wire tends to move faster owing to the increase of the effective diameter of the takeup reel. The same build up increases the load on the motor tending to reduce the speed of the motor. By my combination of a small supply reel, a large takeup reel and a motor of suitable torque-load characteristics I am enabled to balance these two tendencies and provide a machine in which the wire speed is substantially uniform throughout the winding operation.

Although my invention has been described in connection with the specific details of a preferred embodiment thereof, it must be understood that such details are not intended to be limitative of the invention except in so far as set forth in the accompanying claims.

Having thus described my invention, I declare that what I claim is:

1. In a machine for handling magnetic recording medium, in combination, a pair of reels, means rotatably mounting said reels, a motor operatively connected to one reel to drive it for the transfer of medium to it from the other reel, a pair of elements each biased outwardly into engagement with the medium on said other reel, said elements being spaced in the axial direction of said other reel, whereby several convolutions of medium are normally located therebetween, and means arranged to cooperate with either element to stop the motor when either element is disengaged by the medium and is freed to move outwardly.

2. In a machine for handling magnetic recording medium, in combination, a pair of reels, means rotatably mounting said reels, means operatively connected to one reel to drive it for the transfer of medium to it from the other reel, a brake arranged to apply braking force to said other reel, a pair of elements each biased outwardly into engagement with the medium on said other reel, said elements being spaced in the axial direction of said other reel, whereby several convolutions of medium are normally located therebetween, and means arranged to cooperate with either element to apply said brake and terminate the operation of said drive means when either element is disengaged by the medium and is freed to move outwardly.

3. In a machine for handling magnetic recording medium, in combination, a pair of reels, means rotatably mounting said reels, a motor, drive means operatively connecting said motor to one of said reels to drive it for the transfer of medium to it from the other reel, a pair of elements each biased outwardly into engagement with the medium on said other reel, said elements being spaced in the axial direction of said other reel, whereby several convolutions of medium are normally located therebetween, and means arranged to cooperate with either element for disconnecting said drive means from the driven reel when either element is freed to move outwardly by depletion of medium on said other reel.

4. In a machine for handling magnetic recording medium, in combination, a pair of reels, means rotatably mounting said reels, means driving one of said reels for the transfer of medium to it from the other reel, a member associated with said other reel, means centrifugally balancing said member, means applying a constant bias to said member to bias it outwardly against the medium on said other reel, and means controlled by the outward movement of said member when it is freed by depletion of the medium from said other reel, to terminate the drive of the driven reel.

5. A machine for handling magnetic recording medium, a pair of reels, means rotatably mounting said reels, means driving one of said reels for the transfer of medium to it from the other reel, a pair of elements associated with said other reel, means centrifugally balancing each of said elements, means applying a constant bias to each of said elements to bias each of them outwardly against the medium on said other reel, said elements being spaced in the axial direction of said other reel whereby several convolutions of medium are normally located therebetween, and means actuated by either element when it is free to move outwardly by depletion of medium on said other reel for terminating the drive of the driven reel.

6. In a wind and rewind machine for magnetic recording medium, in combination, a supply reel, a takeup reel, an operable brake for each reel, a motor, means for operatively connecting said motor to either reel for wind or rewind of the medium, means for relatively increasing the braking effect of the brake associated with the delivering reel, and means for applying said brakes and terminating the drive of the receiving reel by said motor.

7. In a wind and rewind machine for magnetic recording medium, in combination, a supply reel, a takeup reel, an operable brake for each reel, a motor, means for operatively connecting said motor to either reel for wind or rewind of the medium, means for relatively increasing the braking effect of the brake associated with the delivering reel, and means controlled by the depletion of the medium from the delivering reel for applying said brakes and terminating the drive of the receiving reel by said motor.

8. In a wind and rewind machine for magnetic recording medium, in combination, a supply reel, a takeup reel, an operable brake for each reel, a motor, a switch for said motor, means for operatively connecting said motor to either reel for wind or rewind of the medium, means associated with last said means for relatively increasing the braking effect of the brake associated with the delivering reel, a manually actuable control member arranged selectively to connect the motor to a selected reel, to close the switch and condition the brakes relatively to increase the braking effect of the brake associated with the unconnected reel, and means for actuating said control member to effect the opening of the switch and the application of the brakes.

9. In a wind and rewind machine for magnetic recording medium, in combination, a supply reel, a takeup reel, an operable brake for each reel, a motor, a switch for said motor, means for operatively connecting said motor to either reel for wind or rewind of the medium, means associated with last said means for relatively increasing the braking effect of the brake associated with the delivering reel, a manually actuable control member arranged selectively to connect the motor to a selected reel, to close the switch and condition the brakes relatively to increase the braking effect of the brake associated with the unconnected reel, and means for actuating said control member to effect the opening of the switch, the disconnection of the connected reel from the motor, and the application of the brakes.

10. In a wind and rewind machine for magnetic recording medium, in combination, a supply reel, a takeup reel, an operable brake for each reel, a motor, a switch for said motor, means for operatively connecting said motor to either reel for wind or rewind of the medium, means associated with last said means for relatively increasing the braking effect of the brake associated with the delivering reel, a manually actuable control member arranged selectively to connect the motor to a selected reel, to close the switch and condition the brakes relatively to increase the braking effect of the brake associated with the unconnected reel, and means controlled by the depletion of the medium from the delivering reel for actuating said control member to effect the opening of the switch and the application of the brakes.

11. In a wind and rewind machine for magnetic recording medium, in combination, a supply reel, a takeup reel, an operable brake for each reel, a motor, a switch for said motor, means for operatively connecting said motor to either reel for wind or rewind of the medium, means associated with last said means for relatively increasing the braking effect of the brake associated with the delivering reel, a manually actuable control member arranged selectively to connect the motor to a selected reel, to close the switch and condition the brakes relatively to increase the braking effect of the brake associated with the unconnected reel, and means controlled by the depletion of the medium from the delivering reel for actuating said control member to effect the opening of the switch, the disconnection of the connected reel from the motor, and the application of the brakes.

12. In a wind and rewind machine for handling magnetic recording medium, in combination, a pair of reels, a motor, a switch for the motor, a pair of means for connecting each of said reels to said motor, means applying a slight braking force to each reel, a pair of brakes for applying braking force to each reel, a single control member biased to a normal position in which it opens said switch and controls the disconnection of both connecting means from the reels and the motor and the application of said brakes, said control member being movable to a second position in which it closes said switch and controls the connection of one of said connecting means to one reel and the motor and the location of said brakes in unapplied condition, said control member being movable into a third position in which it closes said switch and controls the connection of the other connecting means to the other reel and motor and the location of the brakes in unapplied condition, latch means retaining said control member in the second and third positions, and means on the delivering reel for disengaging said latch means as the medium approaches depletion therefrom, to permit the control member to move into its first mentioned position.

13. In a wind and rewind machine for handling magnetic recording medium, in combination, a pair of reels, a motor, a switch for the motor, a pair of means for connecting each of said reels to said motor, means applying a slight braking force to each reel, a pair of brakes for applying braking force to each reel, a single control member biased to a normal position in which it opens said switch and controls the disconnection of both connecting means from the reels and the motor and the application of said brakes, said control member being movable to a second position in which it closes said switch and controls the connection of one of said connecting means to one reel and the motor and the location of said brakes in unapplied condition, said control member being movable into a third position in which it closes said switch and controls the connection of the other connecting means to the other reel and motor and the location of the brakes in unapplied condition, latch means retaining said control member in the second and third positions, manually operable means for disengaging said latch means and means on the delivering reel for disengaging said latch means as the medium approaches depletion therefrom, to permit the control member to move into its first mentioned position.

14. In a wind and rewind machine for handling magnetic recording medium, in combination, a pair of reels, a motor, a switch for the motor, a pair of means for connecting each of said reels to said motor, means applying a slight braking force to each reel, a pair of brakes for applying braking force to each reel, a brake for applying braking force on said motor, a single control member biased to a normal position in which it opens said switch and controls the disconnection of both connecting means from the reels and the motor and the application of said brakes, said control member being movable to a second position in which it closes said switch and controls the connection of one of said connecting means to one reel and the motor and the location of said brakes in unapplied condition, said control member being movable into a third position in which it closes said switch and controls the connection of the other connecting means to the other reel and motor and the location of the brakes in unapplied condition, latch means retaining said control member in the second and third positions, and means for releasing said latch means to permit the control member to move into its first mentioned position.

15. In a wind and rewind machine for handling magnetic recording medium, in combination, a pair of reels, a motor, a switch for the motor, a pair of means for connecting each of said reels to said motor, means applying a slight braking force to each reel, a pair of brakes for applying braking force to each reel, a brake for applying braking force on said motor, a single control member biased to a normal position in which it opens said switch and controls the disconnection of both connecting means from the reels and the motor and the application of said brakes, said control member being movable to a second position in which it closes said switch and controls the connection of one of said connecting means to one reel and the motor and the location of said brakes in unapplied condition, said control member being movable into a third position in which it closes said switch and controls the connection of the other connecting means to the other reel and motor and the location of the brakes in unapplied condition, latch means retaining said control member in the second and third positions, and means on the delivering reel for disengaging said latch means as the medium approaches depletion therefrom, to permit the control member to move into its first mentioned position.

16. In a wind and rewind machine for handling magnetic recording medium, in combination, a pair of reels, a motor, a switch for the motor, a pair of means for connecting each of said reels to said motor, means applying a slight braking force to each reel, a pair of brakes for applying braking force to each reel, a brake for applying braking force on said motor, a single control member biased to a normal position in which it opens said switch and controls the disconnection of both connecting means from the reels and the motor and the application of said brakes, said control member being movable to a second position in which it closes said switch and controls the connection of one of said connecting means to one reel and the motor and the location of said brakes in unapplied condition, said control member being movable into a third position in which it closes said switch and controls the connection of the other connecting means to the other reel and motor and the location of the brakes in unapplied condition, latch means retaining said control member in the second and third positions, manually operable means for disengaging said latch means and means on the delivering reel for disengaging said latch means as the medium approaches depletion therefrom, to permit the control member to move into its first mentioned position.

17. In a wind and rewind machine for handling magnetic recording medium, in combination, a pair of reels, a motor, a switch for the motor, a pair of means for connecting each of said reels to said motor, means applying a slight braking force to each reel, a pair of brakes for applying braking force to each reel, a single control member biased to a normal position in which it opens said switch and controls the disconnection of both connecting means from the reels and the motor and the application of said brakes, said control member being movable to a second position in which it closes said switch and controls the connection of one of said connecting means to one reel and the motor and the location of said brakes in unapplied condition, said control member being movable into a third position in which it closes said switch and controls the connection of the other connecting means to the other reel and motor and the location of the brakes in unapplied condition, latch means retaining said control member in the second and third positions, means for releasing said latch means to permit the control member to move into its first mentioned position and means actuated by the movement of the control member into its second and third positions for conditioning the brakes for the reels relatively so that a stronger braking force is applied to the unconnected reel.

18. In a wind and rewind machine for handling magnetic recording medium, in combination, a pair of reels, a motor, a switch for the motor, a pair of means for connecting each of said reels to said motor, means applying a slight braking force to each reel, a pair of brakes for applying braking force to each reel, a brake for applying braking force on said motor, a single control member biased to a normal position in which it opens said switch and controls the disconnection of both connecting means from the reels and the motor and the application of said brakes, said control member being movable to a second position in which it closes said switch and controls the connection of one of said connecting means to one reel and the motor and the location of said brakes in unapplied condition, said control member being movable into a third position in which it closes said switch and controls the connection of the other connecting means to the other reel and motor and the location of the brakes in unapplied condition, latch means retaining said control member in the second and third positions, means on the delivering reel for disengaging said latch means as the medium approaches depletion therefrom, to permit the control member to move into its first mentioned position, and means actuated by the movement of the control member into its second and third positions for conditioning the brakes for the reels relatively so that a stronger braking force is applied to the unconnected reel.

19. In a wind and rewind machine for handling magnetic recording medium, in combination, a pair of reels, a motor, a switch for the motor, a pair of means for connecting each of said reels to said motor, means applying a slight braking force to each reel, a pair of brakes for applying braking force to each reel, a single control member biased to a normal position in which it opens said switch and controls the disconnection of both connecting means from the reels and the motor and the application of said brakes, said control member being movable to a second position in which it closes said switch and controls the connection of one of said connecting means to one reel and the motor and the the location of said brakes in unapplied condition, said control member being movable into a third position in which it closes said switch and controls the connection of the other connecting means to the other reel and motor and the location of the brakes in unapplied condition, latch means retaining said control member in the second and third positions, and electromagnetic means electrically associated with the motor for releasing said latch means when the power fails to permit the control member to move into its first mentioned position.

20. In a wind and rewind machine for handling magnetic recording medium, in combination, a pair of reels, a motor, a switch for the motor, a pair of means for connecting each of said reels to said motor, means applying a slight braking force to each reel, a pair of brakes for applying braking force to each reel, a brake for applying braking force on said motor, a single control member biased to a normal position in which it opens said switch and controls the disconnection of both connecting means from the reels and the motor and the application of said brakes, said control member being movable to a second position in which it closes said switch and controls the connection of one of said connecting means to one reel and the motor and the location of said brakes in unapplied condition, said control member being movable into a third position in which it closes said switch and controls the connection of the other connecting means to the other reel and motor and the location of the brakes in unapplied condition, latch means retaining said control member in the second and third positions, manually operable means for disengaging said latch means, means on the delivering reel for disengaging said latch means as the medium approaches depletion therefrom, to permit the control member to move into its first mentioned position, means actuated by the control member when moved to its second and third positions for relatively increasing the braking effect of the brake associated with the unconnected reel, and electromagnetic means electrically associated with said motor for releasing said latch means when the power fails.

HUGH H. DAVIS.

REFERENCES CITED

The following references are of record in the file of this patent:

UNITED STATES PATENTS

| Number | Name | Date |
|---|---|---|
| 789,336 | Poulsen et al. | May 9, 1905 |
| 947,148 | Browne | Jan. 18, 1910 |
| 947,344 | Nicholson | Jan. 25, 1910 |
| 1,124,879 | Edmond et al. | Jan. 12, 1915 |
| 1,343,910 | Evans | June 22, 1920 |
| 1,374,335 | Sundh | Apr. 12, 1921 |
| 1,552,552 | Gauriat | Sept. 8, 1925 |
| 1,560,721 | O'Reilly | Nov. 10, 1925 |
| 1,847,945 | Hoskins et al. | Mar. 1, 1932 |
| 1,939,181 | McCash et al. | Dec. 12, 1933 |
| 2,119,943 | Marks | June 7, 1938 |
| 2,124,938 | Wittel | July 26, 1938 |
| 2,207,075 | Sperry | July 9, 1940 |
| 2,227,303 | Flaws, Jr. | Dec. 31, 1940 |
| 2,266,755 | Herzig | Dec. 23, 1941 |
| 2,298,339 | Boes | Oct. 13, 1942 |
| 2,304,913 | Herzig | Dec. 15, 1942 |
| 2,349,018 | Tasker | May 16, 1944 |
| 2,359,612 | Bolsey | Oct. 3, 1944 |
| 2,420,671 | Little | May 20, 1947 |
| 2,438,222 | Lear | Mar. 22, 1948 |

FOREIGN PATENTS

| Number | Country | Date |
|---|---|---|
| 852,767 | France | Nov. 9, 1939 |